United States Patent
Higuchi et al.

(10) Patent No.: US 11,807,754 B2
(45) Date of Patent: Nov. 7, 2023

(54) HEAT-CURABLE URETHANE RESIN COMPOSITION, FILM, AND ARTICLE

(71) Applicant: DIC Corporation, Tokyo (JP)

(72) Inventors: Daichi Higuchi, Takaishi (JP); Yuichiro Shiba, Takaishi (JP)

(73) Assignee: DIC Corporation, Tokyo (JP)

( * ) Notice: Subject to any disclaimer, the term of this patent is extended or adjusted under 35 U.S.C. 154(b) by 854 days.

(21) Appl. No.: 16/772,957

(22) PCT Filed: Nov. 1, 2018

(86) PCT No.: PCT/JP2018/040670
§ 371 (c)(1),
(2) Date: Oct. 22, 2020

(87) PCT Pub. No.: WO2019/093219
PCT Pub. Date: May 16, 2019

(65) Prior Publication Data
US 2021/0163738 A1 Jun. 3, 2021

(30) Foreign Application Priority Data
Nov. 7, 2017 (JP) .................................. 2017-214640

(51) Int. Cl.
*C08G 18/44* (2006.01)
*C08L 75/04* (2006.01)
*C08G 18/10* (2006.01)
*C08G 18/32* (2006.01)
*C08G 18/73* (2006.01)
*C08G 18/79* (2006.01)
*C08G 18/83* (2006.01)

(52) U.S. Cl.
CPC .............. *C08L 75/04* (2013.01); *C08G 18/10* (2013.01); *C08G 18/3203* (2013.01); *C08G 18/3206* (2013.01); *C08G 18/44* (2013.01); *C08G 18/73* (2013.01); *C08G 18/791* (2013.01); *C08G 18/83* (2013.01); *C08G 2150/00* (2013.01); *C08L 2203/16* (2013.01)

(58) Field of Classification Search
CPC ...... C08G 18/44; C08G 18/791; C08G 18/73; C08G 18/10; C08G 18/3206; C08G 18/3203; C08L 75/04
See application file for complete search history.

(56) References Cited

U.S. PATENT DOCUMENTS

| | | | | |
|---|---|---|---|---|
| 4,413,111 A | * | 11/1983 | Markusch | C08G 18/10 528/80 |
| 2006/0293468 A1 | * | 12/2006 | Rische | C08G 18/2835 525/457 |
| 2008/0090989 A1 | * | 4/2008 | Lesartre | C08G 18/791 528/65 |
| 2013/0023625 A1 | * | 1/2013 | Montgomery | C08G 18/755 528/370 |

FOREIGN PATENT DOCUMENTS

JP  11152321 A * 6/1999

OTHER PUBLICATIONS

JP-11152321_Jun. 1999_English.*

* cited by examiner

*Primary Examiner* — Michael L Leonard
(74) *Attorney, Agent, or Firm* — Locke Lord LLP; James E. Armstrong, IV; Nicholas J. DiCeglie, Jr.

(57) ABSTRACT

A thermosetting urethane resin composition having excellent self-healing properties, antifouling properties, and elongation, a film including a curable coating of the thermosetting urethane resin composition, and a product including the film are provided. The thermosetting urethane resin composition contains a main agent containing a urethane prepolymer and an organic solvent and a curing agent. The urethane prepolymer contains a composition containing a polyol, a polyisocyanate, and a chain extender and has a hydroxy group at an end. The polyol contains a polyol having no aromatic ring. The polyol having no aromatic ring contains liquid and solid polycarbonate polyols. The polyisocyanate contains a polyisocyanate having no aromatic ring. The chain extender contains a low molecular weight triol. The curing agent contains triisocyanate. The percentage of the total amount of the low molecular weight triol and the triisocyanate is 10 mass % or higher and 35 mass % or lower.

12 Claims, No Drawings

HEAT-CURABLE URETHANE RESIN COMPOSITION, FILM, AND ARTICLE

TECHNICAL FIELD

The present invention relates to a thermosetting urethane resin composition, a film, and a product using the film.

BACKGROUND ART

Thermosetting urethane resin compositions are used for various applications, such as vehicle components, home appliance components, packaging materials, leather-like sheets, and printing rolls.

Products, such as related plastic members and related metal members, have a hard coating layer on the surfaces thereof to prevent scratching (to improve durability) and to maintain the appearance. The hard coating layer is unlikely to get scratched; however, once a scratch is made, the scratch remains. A smudge is attached to the scratch and tends to develop around the scratch. Such a scratch causes degradation in the appearance of a product.

In addition, the above hard coating layer having high hardness is hard and brittle and thus has the following problems: (1) the surface is likely to have cracks or scratches with prolonged use; (2) a scratch made on the surface remains, thereby degrading the appearance of the product; and (3) when a coated substrate is made of a soft material, such as polycarbonate, the intended high hardness is not exhibited, and the durability of the outermost layer is not reliably obtained.

Recently, a thermosetting resin composition having a function of healing a scratch made on the surface (hereinafter, referred to as "self-healing properties") is proposed (see e.g., PTL 1 and PTL 2). Such a thermosetting resin composition having self-healing properties is soft and elastic and thus, when a scratch-like depression is made, the resin can recover to the original state in a few seconds or minutes. Therefore, such a self-healing thermosetting resin has an advantage that initial good scratch resistance can be maintained for a long time.

Related self-healing thermosetting resin compositions have excellent self-healing properties and antifouling properties, but do not elongate much. Thus, there is a problem in which such resins do not have sufficient workability.

Considering the above, a thermosetting resin composition that has self-healing properties and antifouling properties and that can form a coating that has excellent elongation is demanded.

CITATION LIST

Patent Literature

PTL 1: Japanese Unexamined Patent Application Publication No. 2-74540
PTL 2: Japanese Unexamined Patent Application Publication No. 2016-147416

SUMMARY OF INVENTION

Technical Problem

A problem that the present invention addresses is to provide a thermosetting urethane resin composition having excellent self-healing properties, antifouling properties, and elongation, a film including a cured coating of the thermosetting urethane resin composition, and a product including the film.

Solution to Problem

The present inventors conducted a thorough investigation to address the above problem and found that the above problem can be solved by using a thermosetting urethane resin composition containing a main agent and a curing agent, leading to the present invention. The main agent contains a prepolymer and an inorganic solvent. The prepolymer has a hydrogen group at an end and contains a composition containing a polyol having no aromatic ring that contains a specific polyol, a polyisocyanate having no aromatic ring, and a specific chain extender.

In other words, the present invention relates to a thermosetting urethane resin composition, a film including a cured coating of the thermosetting urethane resin composition, and a product using the film. The thermosetting urethane resin composition contains a main agent (i) containing a urethane prepolymer (A) and an organic solvent (B) and a curing agent (ii). The urethane prepolymer (A) has a hydroxy group at an end and contains a composition that contains a polyol (a1), a polyisocyanate (a2) and a chain extender (a3). The polyol (a1) contains a polyol having no aromatic ring (a1-1). The polyol having no aromatic ring (a1-1) contains a polycarbonate polyol that is in a liquid state at 25° C. and a polycarbonate polyol that is in a solid state at 25° C. The polyisocyanate (a2) contains a polyisocyanate having no aromatic ring (a2-1). The chain extender (a3) contains a triol having a molecular weight of 500 or less. The curing agent (ii) contains a triisocyanate. In the thermosetting urethane resin composition (in the constituents constituting the thermosetting urethane resin composition), the percentage of the total amount of the triol having a molecular weight of 500 or less and the triisocyanate is 10 mass % or higher and 35 mass % or lower.

Advantageous Effects of Invention

The thermosetting urethane resin composition according to the present invention can form a film including coating having excellent self-healing properties, antifouling properties, and elongation. Thus, such a resin composition can be suitably used for decorative films and plastic coatings for, for example, automotive vehicles, home appliances, cell phones, OA machines, and components of vehicles.

DESCRIPTION OF EMBODIMENTS

A thermosetting urethane resin composition according to the present invention contains a main agent (i) containing a urethane prepolymer (A) and an organic solvent (B) and a curing agent (ii). The urethane prepolymer (A) contains a composition that contains a polyol (a1), a polyisocyanate (a2), and a chain extender (a3). "Main agent" in the present invention is contained more than 50 mass % relative to the total amount of the composition. In other words, the percentage of the curing agent (ii) is less than 50 mass % in the thermosetting urethane resin composition according to the present invention.

The urethane prepolymer (A) has a hydroxy group at an end of the molecule thereof. In particular, the urethane prepolymer (A) preferably has no aromatic ring. The urethane prepolymer (A) may be obtained by mixing the polyisocyanate (a2) and all of the polyol (a1) and the chain extender (a3) at one time or by mixing the polyisocyanate (a2) and at least portions of the polyol (a1) and the chain extender (a3) and thereafter, mixing the obtained preliminary prepolymer and the remaining portions of the polyol (a1) and the chain extender (a3). In particular, the urethane prepolymer (A) is preferably obtained by mixing the polyisocyanate (a2), the chain extender (a3), and at least a portion of the polyol (a1) (preferably solid polycarbonate polyol described later), and thereafter mixing the obtained preliminary prepolymer and the remaining portion of the polyol (a1) (preferably liquid polycarbonate polyol described later). The urethane prepolymer (A) and the preliminary prepolymer may contain the polyol (a1) and/or the polyisocyanate (a2) that have not been reacted.

The polyol (a1) contains a polyol having no aromatic ring (a1-1). The polyol having no aromatic ring (a1-1) contains a polycarbonate polyol having no aromatic ring.

The polycarbonate polyol having no aromatic ring may be an aliphatic polycarbonate polyol or a polycarbonate polyol having an alicyclic structure (hereinafter, may be referred to as just "alicyclic" when an alicyclic structure is contained) and is preferably an aliphatic polycarbonate polyol. The aliphatic or alicyclic polycarbonate polyol may be a compound obtained by esterification reaction of carbonic acid, an aliphatic or alicyclic carbonate ester, and an aliphatic or alicyclic polyol. Examples of the aliphatic or alicyclic carbonate ester include methyl carbonate, dimethyl carbonate, ethyl carbonate, diethyl carbonate, and cyclocarbonate. Examples of the aliphatic or alicyclic polyol include 1,3-propanediol, 1,4-butanediol, 1,6-hexanediol, diethylene glycol, polyethylene glycol, polypropylene glycol, polytetramethylene ether glycol, and 1,4-cyclohexanedimethanol. Such polycarbonate polyols may be used alone or in a combination of two or more.

The polycarbonate polyol having no aromatic ring contains a polycarbonate polyol that is in a liquid state at 25° C. (hereinafter, may be referred to as just "liquid polycarbonate polyol") and a polycarbonate polyol that is in a solid state at 25° C. (hereinafter, may be referred to as just "solid polycarbonate polyol").

The liquid polycarbonate polyol is in a liquid state at 25° C. and may be amorphous or crystalline polycarbonate polyol. Amorphous polycarbonate polyol is preferable. The number of hydroxy groups contained in the liquid polycarbonate polyol is preferably two.

The liquid polycarbonate polyol preferably has a viscosity of 10,000 mPa·s or less, more preferably 7,000 mPa·s or less, still more preferably 5,000 mPa·s or less, for example, 100 mPa·s or more, and preferably 500 mPa·s or more at room temperature (25° C.)

The liquid polycarbonate polyol preferably has a number average molecular weight of more than 500, more preferably 600 or more, still more preferably 700 or more, preferably less than 2,000, more preferably 1,800 or less, and still more preferably 1,500 or less.

The liquid polycarbonate polyol preferably has a glass transition temperature of −100° C. or higher, more preferably −90° C. or higher, still more preferably −80° C. or higher, particularly preferably −75° C. or higher, preferably −5° C. or lower, more preferably −15° C. or lower, still more preferably −25° C. or lower, and particularly preferably −35° C. or lower.

The amount of the liquid polycarbonate polyol in a thermosetting urethane resin composition (in the constituents constituting the thermosetting urethane resin composition) is preferably 25 mass % or more, more preferably 30 mass % or more, preferably 50 mass % or less, and more preferably 45 mass % or less.

The solid polycarbonate polyol refers to a polycarbonate polyol that is in a solid state at 25° C. and that is a crystalline polycarbonate polyol having a crystallization temperature of higher than 25° C. The number of hydroxy groups contained in the solid polycarbonate polyol is preferably two.

The solid polycarbonate polyol preferably has a crystallization temperature of 30° C. or higher, more preferably 35° C. or higher, still more preferably 40° C. or higher, preferably 100° C. or lower, more preferably 80° C. or lower, and still more preferably 70° C. or lower.

The percentage of the liquid polycarbonate polyol in the polycarbonate polyol having no aromatic ring is preferably 20 mass % or higher, more preferably 30 mass % or higher, still more preferably 35 mass % or higher, preferably 80 mass % or lower, more preferably 70 mass % or lower, and still more preferably 65 mass % or lower. The percentage of the liquid polycarbonate polyol within the above range is likely to improve self-healing properties, antifouling properties, and elongation.

The percentage of the polycarbonate polyol having no aromatic ring in the total amount of the polyol (a1) is preferably 70 mass % or higher, more preferably 80 mass % or higher, still more preferably 90 mass % or higher, still more preferably 95 mass % or higher, and particularly preferably 99 mass % or higher. The upper limit is 100 mass %.

As the polyol having no aromatic ring (a1-1), another polyol having no aromatic ring (preferably an aliphatic or alicyclic polyol), such as a polyester polyol having no aromatic ring or a polyether polyol having no aromatic ring, may be optionally used in combination.

The polyester polyol having no aromatic ring may be an aliphatic or alicyclic polyester polyol and is preferably an aliphatic polyester polyol. Examples of the polyester polyol include polyester polyols obtained by reaction of a low molecular weight polyol and a polycarboxylic acid; polyester polyols obtained by ring-opening polymerization of a cyclic ester compound, such as ε-caprolactone; and polyester polyols obtained by copolymerization of the above compounds. Such polyester polyols may be used alone or in a combination of two or more.

Examples of the low molecular weight polyol include aliphatic polyols, such as ethylene glycol, diethylene glycol, triethylene glycol, tetraethylene glycol, 1,2-propanediol, 1,3-propanediol, dipropylene glycol, tripropylene glycol, 1,2-butanediol, 1,3-butanediol, 1,4-butanediol, 2,3-butanediol, 1,5-penetanediol, 1,5-hexanediol, 1,6-hexanediol, 2,5-hexanediol, 1,7-heptanediol, 1,8-octanediol, 1,9-nonanediol, 1,10-decanediol, 1,11-undecanediol, 1,12-dodecanediol, 2-methyl-1,3-propanediol, neopentyl glycol, 2-butyl-2-ethyl-1,3-propanediol, 3-methyl-1,5-pentanediol, 2-ethyl-1,3-hexanediol, 2-methyl-1,8-octanediol, glycerol, trimethylolpropane, ditrimethylolpropane, trimethylolpropane, and pentaerythritol, and alicyclic polyols, such as 1,4-cyclohexanedimethanol and hydrogenated bisphenol A.

The polycarboxylic acid may be a polycarboxylic acid having no aromatic ring. Examples of such a polycarboxylic acid include aliphatic polycarboxylic acids, such as succinic acid, adipic acid, suberic acid, azelaic acid, sebacic acid, dodecane dicarboxylic acid, and dimer acid, and alicyclic polycarboxylic acids, such as 1,4-cyclohexane dicarboxylic acid and cyclohexane tricarboxylic acid.

The polyether polyol having no aromatic ring may be an aliphatic or alicyclic polyether polyol and is preferably an aliphatic polyether polyol. The polyether polyol may be polytetramethylene glycol obtained by ring-opening polymerization of tetrahydrofuran. The polyether polyol may be a compound obtained by addition polymerization of alkylene oxide by using, as an initiator, one or two or more compounds having two or more active hydrogen atoms. Examples of the compound having two or more active hydrogen atoms include propylene glycol, trimethylene glycol, 1,3-butanediol, 1,4-butanediol, 1,6-hexanediol, neopentyl glycol, glycerol, diglycerol, trimethylolethane, trimethylolpropane, water, and hexanetriol. Examples of the alkylene oxide include propylene oxide, butylene oxide, styrene oxide, epichlorohydrin, and tetrahydrofuran. Such polyether polyols may be used alone or in a combination of two or more.

The polyol (a1) may contain a polyol having an aromatic ring (a1-2), provided that effects of the present invention are not degraded. The percentage of the polyol having an aromatic ring (a1-2) in the polyol (a1) is preferably 30 mass % or lower, more preferably 20 mass % or lower, still more preferably 10 mass % or lower, still more preferably 5 mass % or lower, and particularly preferably 1 mass % or lower. The lower limit is 0 mass %.

The polyol (a1) preferably has a number average molecular weight of higher than 500, more preferably 600 or higher, still more preferably 700 or higher, preferably 10,000 or lower, more preferably 5,000 or lower, and still more preferably 4,000 or lower.

In the present description, the number average molecular weight of the polyol (a1) is measured by gel permeation chromatography (GPC) and is equivalent to that of polystyrene used as the standard sample.

Examples of the polyisocyanate having no aromatic ring (a2) include alicyclic polyisocyanates, such as cyclohexane diisocyanate, dicyclohexylmethane diisocyanate, and isophorone diisocyanate; and aliphatic polyisocyanates, such as hexamethylene diisocyanate, lysine diisocyanate, xylylene diisocyanate, and tetramethylxylylene diisocyanate. Among such compounds, from the viewpoint of self-healing properties, antifouling properties, and elongation of the obtained coating, hexamethylene diisocyanate is preferably used. Such polyisocyanates (a2) may be used alone or in a combination of two or more.

The chain extender (a3) contains a low molecular weight triol having a molecular weight of 500 or less. The low molecular weight triol preferably has a molecular weight of 300 or less and more preferably 250 or less. The molecular weight of the chain extender (a3) can be calculated according to the chemical formula.

The low molecular weight triol has three hydroxy groups, and examples thereof include glycerol; compounds having a C1 to C4 linear alkane that has a carbon atom at the end to which three methylol groups (hydroxymethyl group) are bonded, such as trimethylolmethane, trimethylolethane, trimethylolpropane, and trimethylolbutane; 1,2,5-hexanetriol; and oxyalkylene adducts of trimethylolpropane (2 to 4 carbon atoms, preferably oxyethylene adduct). Such low molecular weight triols may be used alone or in a combination of two or more. In the oxyalkylene adduct of trimethylolpropane (preferably oxyethylene adduct), the number of moles of oxyalkylene (preferably oxyethylene) added is not particularly limited. Relative to one trimethylolpropane molecule, six moles or lower is preferable. Among such compounds, from the viewpoint of self-healing properties, antifouling properties, and elongation of the obtained coating, a compound having a C1 to C4 linear alkane that has a carbon atom at the end thereof to which three methylol groups (hydroxymethyl group) are bonded is preferable, and trimethylolpropane is more preferable.

Examples of the chain extender (a3) include aliphatic polyols, such as ethylene glycol, diethylene glycol, triethylene glycol, tetraethylene glycol, 1,2-propanediol, 1,3-propanediol, dipropylene glycol, tripropylene glycol, 1,2-butanediol, 1,3-butanediol, 1,4-butanediol, 2,3-butanediol, 1,5-penetanediol, 1,5-hexanediol, 1,6-hexanediol, 2,5-hexanediol, 1,7-heptanediol, 1,8-octanediol, 1,9-nonanediol, 1,10-decanediol, 1,11-undecanediol, 1,12-dodecanediol, 2-methyl-1,3-propanediol, neopentyl glycol, 2-butyl-2-ethyl-1,3-propanediol, 3-methyl-1,5-pentanediol, 2-ethyl-1,3-hexanediol, 2-methyl-1,8-octanediol, glycerol, trimethylolpropane, ditrimethylolpropane, trimethylolpropane, and pentaerythritol, and polyols having an aliphatic cyclic structure, such as 1,4-cyclohexanedimethanol and hydrogenated bisphenol A, in addition to the low molecular weight triols.

The chain extender (a3) preferably has a molecular weight of 500 or less, more preferably 300 or less, and still more preferably 250 or less.

The percentage of the low molecular weight triol in the chain extender (a3) is preferably 60 mass % or higher, more preferably 70 mass % or higher, and still more preferably 80 mass %. The upper limit is 100 mass %.

The amount of the chain extender (a3) relative to the 100 parts by mass of the total amount of the urethane prepolymer is preferably 1 parts by mass or more, more preferably 3 parts by mass or more, still more preferably 5 parts by mass or more, preferably 50 parts by mass or less, more preferably 40 parts by mass or less, and still more preferably 36 parts by mass or less.

From the viewpoint of self-healing properties, antifouling properties, and elongation of the obtained coating, the urethane prepolymer (A) preferably has a hydroxyl equivalent of 400 g/eq. or more, more preferably 450 g/eq. or more, preferably 4000 g/eq. or less, and more preferably 3000 g/eq. or less.

The thermosetting urethane resin composition according to the present invention may contain another urethane prepolymer in addition to the urethane prepolymer (A). In the thermosetting urethane resin composition according to the present invention, the percentage of the urethane prepolymer (A) in the total amount of urethane prepolymers is preferably 80 mass % or higher, more preferably 90 mass % or higher, and still more preferably 95 mass % or higher. The upper limit is 100 mass %.

The percentage of the urethane prepolymer (A) in the nonvolatile content of the thermosetting urethane resin composition is preferably 60 mass % or higher, more preferably 65 mass % or higher, still more preferably 60 mass % or higher, preferably 99 mass % or lower, and more preferably 96 mass % or lower. The nonvolatile content of the thermosetting urethane resin composition refers to an amount obtained by subtracting the amount of organic solvent from the total amount of the thermosetting urethane resin composition.

Examples of the organic solvent (B) include ketone solvents, such as acetone, methyl ethyl ketone, cyclohexanone, and acetyl acetone; ether solvents, such as tetrahydrofuran and dioxane; ester solvents, such as ethyl acetate and butyl acetate; nitrile solvents, such as acetonitrile; amido solvents, such as dimethylformamide and N-methyl pyrrolidone. Such organic solvents may be used alone or in a combination of two or more.

The percentage of the organic solvent (B) in the thermosetting urethane resin composition (in the constituents constituting the thermosetting urethane resin composition) is preferably 30 mass % or higher, more preferably 40 mass % or higher, still more preferably 50 mass % or higher, preferably 80 mass % or lower, more preferably 70 mass % or lower, and still more preferably 65 mass % or lower.

The curing agent (ii) contains a triisocyanate. The triisocyanate can react with a hydroxy group of the urethane prepolymer (A) in the main agent (i).

The triisocyanate has three isocyanate groups. Examples of the triisocyanate include isocyanurates of a diisocyanate and trimethylolpropane adducts of a diisocyanate. An isocyanurate of a diisocyanate is preferable. Examples of the diisocyanate include aliphatic diisocyanates, such as hexamethylene diisocyanate, and alicyclic diisocyanates, such as isophorone diisocyanate. Among such compounds, from the viewpoint of self-healing properties, antifouling properties, and elongation of the obtained coating, an isocyanurate of an aliphatic diisocyanate is preferable, and an isocyanurate of hexamethylene diisocyanate is more preferable. Such isocyanate compounds may be used alone or in a combination of two or more.

As the curing agent (ii), another isocyanate compound may be optionally used in combination in addition to the triisocyanate.

Examples of another isocyanate compound include polyisocyanates having an alicyclic structure, such as cyclohexane diisocyanate, dicyclohexylmethane diisocyanate, and isophorone diisocyanate; and aliphatic polyisocyanates, such as hexamethylene diisocyanate, lysine diisocyanate, xylylene diisocyanate, and tetramethylxylylene diisocyanate.

The percentage of the triisocyanate in the curing agent (ii) is preferably 80 mass % or higher, more preferably 90 mass % or higher, and still more preferably 95 mass % or higher. The upper limit is 100 mass %.

The percentage of the curing agent (ii) in a thermosetting urethane resin composition (in the constituents constituting the thermosetting urethane resin composition) is lower than 50 mass %, preferably 40 mass % or lower, more preferably 30 mass % or lower, and still more preferably 20 mass % or lower. The lower limit may be 0.1 mass %.

The thermosetting urethane resin composition according to the present invention may be produced by placing the main agent (i) and the curing agent (ii) in different tanks of a two-component mixing casting machine and mixing the main agent (i) and the curing agent (ii) together at normal temperature in the mixing casting machine.

The equivalent ratio (NCO/OH) of the isocyanate group (NCO) of the curing agent (ii) to the hydroxy group (OH) of the main agent (i) is preferably 0.8 or higher, more preferably 0.9 or higher, preferably 1.5 or lower, and more preferably 1.2 or lower. The equivalent ratio within the range is likely to enable the obtained coating to have good elongation.

The percentage of the total amount of the low molecular weight triol and the triisocyanate in a thermosetting urethane resin composition (in the constituents constituting the thermosetting urethane resin composition) is preferably 10 mass % or higher, more preferably 15 mass % or higher, preferably 35 mass % or lower, and more preferably 30 mass % or lower. The total amount within the above range is likely to enable the obtained coating to have good self-healing properties, antifouling properties, and elongation.

The thermosetting urethane resin composition according to the present invention may optionally contain an additive, provided that the effects of the present invention are not degraded. Examples of the additive include tackifiers, leveling agents, catalysts, plasticizing agents, stabilizers, fillers, pigments, dyes, and flame retardants.

Examples of the tackifier include rosin-based resins, rosin ester-based resins, hydrogenated rosin ester-based resins, terpene-based resins, terpene phenol-based resins, hydrogenated terpene-based resins, and petroleum resins, such as C5-based aliphatic resins, C9-based aromatic resins, and copolymer resins of a C5-based resin and a C9-based resin.

Examples of the leveling agent include silicone-based compounds, acetylenediol-based compounds, and fluorine-based compounds.

Examples of the catalyst include tertiary amine catalysts and organic metal-based catalysts.

Examples of the plasticizing agent include dibutyl phthalate, dioctyl phthalate, dicyclohexyl phthalate, diisooctyl phthalate, diisodecyl phthalate, dibenzyl phthalate, butylbenzyl phthalate, trioctyl phosphate, epoxy-based plasticizing agents, toluene-sulphoamide, chloroparaffin, adipic acid esters, and castor oil. The methyl acid phosphate (AP-1) or an acryl-based surface additive (BYK-361N) may be used.

Examples of the stabilizer include hindered phenol-based compounds, benzotriazole-based compounds, and hindered amine-based compounds.

Examples of the filler include silicate derivatives, talc, metal powder, calcium carbonate, clay, and carbon black.

A film according to the present invention has a cured coating of the thermosetting urethane resin composition on the substrate of the film.

The substrate may be formed of polyethylene terephthalate (PET), polyvinyl chloride (PVC), thermoplastic urethane (TPU), or thermosetting urethane (TSU).

The method for producing the film according to the present invention may be a method that includes applying the thermosetting urethane resin composition to the surface of a substrate by a slit coater method, such as a curtain flow coater method or a die coater method, a knife coater method, or a roll coater method, and curing by heat after optionally performing drying. The drying may be natural drying at normal temperature or heat drying. The heat drying is preferably performed typically at 40° C. to 250° C. for about 1 to 1000 seconds. A secondary curing process in which heat drying is performed at 40° C. to 100° C. for about 1 to 24 hours may be performed.

The thermosetting urethane resin composition according to the present invention may be suitably used for, for example, metal substrates used for automobiles, home appliances, cell phones, OA machines, and automobile components, such as aluminum sheets, aluminum alloy sheets, electrical steel sheets, copper sheets, stainless steel sheets, and plated steel sheets. Examples of the plated steel sheet include zinc-plated steel sheets and aluminum-zinc alloy steel sheets.

EXAMPLES

Hereinafter, the present invention will be specifically described with reference to Examples and Comparative Examples.

Preparation Example 1

Preparation of Main Agent (1)

Into a 1-L 4-neck round bottom flask equipped with a nitrogen introducing tube, a thermometer, and a stirrer, 100 parts by weight of methyl ethyl ketone, 100 parts by weight of ethyl acetate, 50 parts by weight of solid polycarbonatediol (ETERNACOLL UH-200, manufactured by Ube Industries, Ltd.), which had been heated at 50° C. and melted, and 5 parts by weight of trimethylolpropane were poured and stirred. Then, 13 parts by mass of hexamethylene diisocyanate and 0.02 parts by weight of dibutyltin dilaurate were added. The inner temperature was raised to 70° C. while attention was paid to heat generation, and thereafter, stirring was performed with the temperature maintained. Then, 50 parts by mass of liquid polycarbonatediol (DURANOL G3452, manufactured by Asahi Kasei Corp.) was added, and stirring was continued. After the temperature was raised to 70° C., stirring was continued for four hours. The main agent (i) that has a hydroxyl equivalent of 2205 and that contains a urethane prepolymer having a hydroxy group at an end of the molecule was obtained.

Preparation Examples 2 to 12

Preparation of Main Agent (ii) to (xii)

The main agents (ii) to (xii) having a hydroxy group at an end of the molecule were obtained in the same manner as the main agent in Preparation Example 1, except that polyols and polyisocyanates used, the types and amounts of cross-linking agents, the hydroxy group equivalent weight of the obtained prepolymers were changed in accordance with those in Tables 1 and 2.

In Tables, ETERNACOLL UM-90 refers to a liquid polycarbonatediol (ETERNACOLL UM-90, manufactured by Ube Industries, Ltd.). Hydrogenated MDI refers to hydrogenated diphenylmethane diisocyanate.

[Liquid Stability of Main Agent at Low Temperature]

The obtained main agent was left to stand for three days in a room in which the temperature was adjusted to 0° C. The appearance was checked by visual inspection, and a clear solution that is not clouded by the resin and that does not have precipitation of the resin was evaluated as excellent.

Example 1

Production of Curing Agent

Hundred parts by weight of the main agent (i) obtained in Preparation Example 1, 2.9 parts by weight of polyisocyanate (nurate of hexamethylene diisocyanate, BURNOCK 902S, manufactured by DIC Corporation), and 0.3 parts by weight of a leveling agent (Silclean 3700, manufactured by BYK Japan KK) were mixed together to obtain a thermosetting urethane resin composition used as a urethane resin coating liquid. The coating liquid was applied by using a knife coater to a polyethylene terephthalate film to which release treatment had been performed, such that the coating had a thickness of 30 μm. Furthermore, primary curing was performed by heating in an oven at 110° C. for 2 minutes to obtain a predetermined film.

Examples 2 to 6 and Comparative Examples 1 to 6

A predetermined film was obtained in the same manner as that in Example 1, except that the type and amount of main agent and polyisocyanate used were changed in accordance with those in Tables 1 and 2.

In Tables, Desmodur W refers to dicyclohexylmethane-4,4'-diisocyanate.

In Tables 1 and 2, the hydroxyl equivalent of urethane prepolymers contained in the main agents (i) to (xii), the percentage of the liquid polycarbonate polyol in the thermosetting urethane resin composition (in the constituents constituting the thermosetting urethane resin composition), and the percentage of the total amount of the triol having a molecular weight of 500 or less and the triisocyanate are shown.

The following evaluations of the films obtained in Examples and Comparative Examples were performed.

[Method for Evaluating Coatability]

The surface of the film produced by heat curing was observed by visual inspection. A flat surface without cissing and irregularities was evaluated as ○, and a surface with cissing and irregularities that cannot be practically used as a coating material was evaluated as x.

[Method for Evaluating Tackiness]

A film without tackiness was evaluated as ○, and a film without tackiness was evaluated as x. x: a film with tackiness

[Method for Evaluating Antifouling Property]

A line was drawn with a marker pen (PENTEL PEN, black, middle character) on the film and was wiped off with a tissue. The ease of wiping was evaluated in accordance with the following criteria.

⊙: A line drawn with a marker pen was completely wiped off with five wipes.

○: A line drawn with a marker pen was completely wiped off with ten wipes.

Δ: A line drawn with a marker pen was partially wiped off with ten wipes.

x: A line drawn with a marker pen was scarcely wiped off with ten wipes.

[Method for Evaluating Self-Healing Property]

A brass brash was pressed on the coating of the film at a load of 500 g and moved for 10 reciprocating cycles. Thereafter, the presence of a scratch was observed by visual inspection and evaluated with the following criteria.

⊙: A scratch is healed in one minute.

○: A scratch is healed in 10 minutes.

Δ: A scratch is healed in one hour.

x: A scratch is not healed after one hour.

[Method for Evaluating Elongation]

The film was cut into strips having a width of 1 cm and a length of 5 cm. Then, the film was pulled by using "Autograph AG-I" manufactured by Shimadzu Corporation to measure the elongation ratio (elongation).

⊙: 200% or higher

○: 100% or higher and lower than 200%

Δ: 150% or higher and lower than 180% x: lower than 100%

TABLE 1

| | | Examples | | | | | |
|---|---|---|---|---|---|---|---|
| | | 1 | 2 | 3 | 4 | 5 | 6 |
| Main agent | | (i) | (ii) | (iii) | (iv) | (v) | (vi) |
| Polycarbonate polyol | ETERNACOLL UH-200 | 50 | 50 | 50 | 60 | 40 | 50 |
| Liquid polycarbonate polyol | DURANOL G-3452 | 50 | 50 | 50 | 40 | | 50 |
| | ETERNACOLL UM-90 | | | | | 60 | |
| Polyether | PTMG-2000 | | | | | | |
| Chain extender | Ethylene glycol | | | | | | |
| | Trimethylolpropane | 5 | 8 | 14 | 6 | 6 | 6 |
| Polyisocyanate | Hydrogenated MDI | | | | | | 13 |
| | Hexamethylene diisocyanate | 13 | 13 | 13 | 13 | 13 | |
| Solvent | Ethyl acetate | 100 | 100 | 100 | 100 | 100 | 100 |
| | Methyl ethyl ketone | 100 | 100 | 100 | 100 | 100 | 100 |
| Total weight (g) | | 318 | 321 | 327 | 319 | 319 | 319 |
| Hydroxyl equivalent (g/eq.) | | 2205 | 1003 | 499 | 1558 | 786 | 904 |
| Polyisocyanate | | | | | | | |
| Triisocyanate | BURNOCK DN-902S | 9.1 | 20.5 | 43.3 | 13.0 | 25.7 | 22.3 |
| Diisocyanate | Desmodur W | | | | | | |
| Additive | Silclean 3700 | 1.00 | 1.00 | 1.00 | 1.00 | 1.00 | 1.00 |
| Percentage of liquid polycarbonate polyol | | 39.3% | 35.3% | 29.4% | 30.3% | 41.4% | 35.3% |
| Percentage of the total amount of low molecular weight triol and the triisocyanate | | 11.1% | 20.1% | 33.6% | 14.4% | 21.9% | 29.2% |
| Liquid stability of main agent at low temperature | | clear | clear | clear | clear | clear | clear |
| Coatability | | ○ | ○ | ○ | ○ | ○ | ○ |
| Tackiness | | ○ | ○ | ○ | Δ | ○ | ○ |
| Antifouling property | | ○ | ○ | ○ | ○ | ○ | ○ |
| Self-healing property (brass brash) | | ⊙ | ⊙ | ○ | ⊙ | ⊙ | ⊙ |
| Elongation | | 240% | 180% | 120% | 200% | 200% | 180% |
| | | ⊙ | ○ | ○ | ⊙ | ⊙ | ○ |

TABLE 2

| | | Comparative Examples | | | | | |
|---|---|---|---|---|---|---|---|
| | | 1 | 2 | 3 | 4 | 5 | 6 |
| Main agent | | (vii) | (viii) | (ix) | (x) | (xi) | (xii) |
| Polycarbonate polyol | ETERNACOLL UH-200 | 40 | 50 | | 50 | 50 | |
| Liquid polycarbonate polyol | DURANOL G-3452 | 60 | 50 | | 50 | 50 | 100 |
| | ETERNACOLL UM-90 | | | | | | |
| Polyether | PTMG-2000 | | | 100 | | | |
| Chain extender | Ethylene glycol | | | | | 4 | |
| | Trimethylolpropane | 4 | 16 | 8 | 8 | | 8 |
| Polyisocyanate | Hydrogenated MDI | | | | | | |
| | Hexamethylene diisocyanate | 13 | 13 | 13 | 13 | 11 | 13 |
| Solvent | Ethyl acetate | 100 | 100 | 100 | 100 | 100 | 100 |
| | Methyl ethyl ketone | 100 | 100 | 100 | 100 | 100 | 100 |
| Total weight (g) | | 317 | 329 | 321 | 321 | 315 | 321 |
| Hydroxyl equivalent (g/eq.) | | 3818 | 431 | 967 | 1003 | 1216 | 1024 |
| Polyisocyanate | | | | | | | |
| Triisocyanate | BURNOCK DN-902S | 5.2 | 50.8 | 21.2 | | 16.1 | 20.1 |
| Diisocyanate | Desmodur W | | | | 21.9 | | |
| Additive | Silclean 3700 | 1.00 | 1.00 | 1.00 | 1.00 | 1.00 | 1.00 |
| Percentage of liquid polycarbonate polyol | | 49.1% | 27.8% | 0.0% | 35.0% | 38.1% | 70.8% |
| Percentage of the total amount of low molecular weight triol and the triisocyanate | | 7.5% | 37.1% | 20.5% | 5.6% | 12.2% | 19.9% |
| Liquid stability of main agent at low temperature | | clear | clear | clear | clear | clear | clear |
| Coatability | | ○ | X | ○ | ○ | X | X |
| Tackiness | | X | ○ | ○ | X | X | X |
| Antifouling property | | X | ○ | X | X | X | X |
| Self-healing property (brass brash) | | ○ | X | ⊙ | ⊙ | ⊙ | ⊙ |
| Elongation | | 350% | 90% | 180% | 400% | 300% | 250% |
| | | ⊙ | X | ○ | ○ | ⊙ | ⊙ |

Films in Examples 1 to 6 are formed of the thermosetting urethane resin composition according to the present invention and have a self-healing property, an antifouling property, and good elongation.

In Comparative Examples 1 and 4, the percentage of the total amount of the low molecular weight triol and the triisocyanate is low. In Comparative Example 2, the percentage of the total amount of the low molecular weight triol and the triisocyanate is high. In Comparative Example 3, a liquid polycarbonate polyol is not contained. In Comparative Example 4, a triisocyanate is not contained as a cross-linking agent. In Comparative Example 5, a triol is not contained as a chain extender. In Comparative Example 6, a solid polycarbonate polyol is not contained. In any of the above examples, the self-healing property, the antifouling property, and the elongation are not all exhibited.

The invention claimed is:

1. A thermosetting urethane resin composition comprising a main agent (i) containing a urethane prepolymer (A) and an organic solvent (B) and a curing agent (ii), the urethane prepolymer (A) having a hydroxy group at an end and containing a composition that contains a polyol (a1), a polyisocyanate (a2), and a chain extender (a3), wherein:
the polyol (a1) contains a polyol having no aromatic ring (a1-1),
the polyol having no aromatic ring (a1-1) contains a polycarbonate polyol that is in a liquid state at 25° C. and a polycarbonate polyol that is in a solid state at 25° C.,
the polyisocyanate (a2) contains a polyisocyanate having no aromatic ring (a2-1),
the chain extender (a3) contains a triol having a molecular weight of 500 or less,
the curing agent (ii) contains a triisocyanate,
in the thermosetting urethane resin composition, a percentage of a total amount of the triol having a molecular weight of 500 or less and the triisocyanate is 10 mass % or higher and 35 mass % or lower, and
in the thermosetting urethane resin composition, a percentage of the polycarbonate polyol in a liquid state at 25° C. is 25 mass % or higher and 50 mass % or lower.

2. The thermosetting urethane resin composition according to claim 1, wherein the triol having a molecular weight of 500 or less is trimethylolpropane.

3. The thermosetting urethane resin composition according to claim 1, wherein the triisocyanate is an isocyanurate of hexamethylene diisocyanate.

4. The thermosetting urethane resin composition according to claim 2, wherein the triisocyanate is an isocyanurate of hexamethylene diisocyanate.

5. A film comprising a cured coating of the thermosetting urethane resin composition according to claim 1.

6. A film comprising a cured coating of the thermosetting urethane resin composition according to claim 2.

7. A film comprising a cured coating of the thermosetting urethane resin composition according to claim 3.

8. A film comprising a cured coating of the thermosetting urethane resin composition according to claim 4.

9. A product comprising the film according to claim 5.

10. A product comprising the film according to claim 6.

11. A product comprising the film according to claim 7.

12. A product comprising the film according to claim 8.

* * * * *